United States Patent
Miessmer et al.

(10) Patent No.: US 11,951,525 B2
(45) Date of Patent: Apr. 9, 2024

(54) METHOD FOR PRODUCING A WELDED RING

(71) Applicant: OETIKER SCHWEIZ AG, Horgen (CH)

(72) Inventors: Stefan Miessmer, Zurich (CH); Andreas Vetter, Pfäffikon (CH)

(73) Assignee: OETIKER SCHWEIZ AG (CH)

( * ) Notice: Subject to any disclaimer, the term of this patent is extended or adjusted under 35 U.S.C. 154(b) by 54 days.

(21) Appl. No.: 16/491,976

(22) PCT Filed: Mar. 9, 2017

(86) PCT No.: PCT/EP2017/055542
§ 371 (c)(1),
(2) Date: Jan. 27, 2020

(87) PCT Pub. No.: WO2018/162063
PCT Pub. Date: Sep. 13, 2018

(65) Prior Publication Data
US 2020/0156140 A1  May 21, 2020

(51) Int. Cl.
*B21D 53/16* (2006.01)
*B23K 9/025* (2006.01)
(Continued)

(52) U.S. Cl.
CPC ............ *B21D 53/16* (2013.01); *B23K 9/0253* (2013.01); *B23K 26/26* (2013.01); *B23K 26/262* (2015.10);
(Continued)

(58) Field of Classification Search
CPC ........ B23K 26/28; B23K 26/30; B23K 26/26; B23K 2101/30; B23K 9/0253;
(Continued)

(56) References Cited

U.S. PATENT DOCUMENTS

| 1,863,873 A | 6/1932 | Quarnstrom |
| 1,967,821 A * | 7/1934 | Hess ................. F16C 33/64 384/570 |

(Continued)

FOREIGN PATENT DOCUMENTS

| CN | 203495422 U * | 3/2014 | ............ B23K 35/14 |
| CN | 103707002 A | 4/2014 | |

(Continued)

OTHER PUBLICATIONS

Machine English Translation of CN-203495422-U (Year: 2014).*
(Continued)

*Primary Examiner* — Tu B Hoang
*Assistant Examiner* — Erwin J Wunderlich
(74) *Attorney, Agent, or Firm* — Barnes & Thornburg LLP

(57) ABSTRACT

For producing a welded ring, a band of a length corresponding to the circumference of the ring is bent into a ring and its two ends are welded together. The band ends to be welded together have an offset in the circumferential direction of the ring, the offset lying in the plane of the band. The welding is performed from both lateral edges of the ring, from the outside to the inside up to the offset. Welding having an overall improved welding quality and a higher tensile strength is thus obtained.

2 Claims, 2 Drawing Sheets

(51) Int. Cl.
  *B23K 26/26* (2014.01)
  *B23K 26/262* (2014.01)
  *B23K 26/28* (2014.01)
  *B23K 101/30* (2006.01)
  *F16J 15/3252* (2016.01)

(52) U.S. Cl.
  CPC .......... *B23K 26/28* (2013.01); *F16J 15/3252* (2013.01); *B23K 2101/30* (2018.08)

(58) Field of Classification Search
  CPC .. B23K 26/262; B23K 2101/03; B21D 53/16; F16J 15/3252
  USPC .................................................... 219/121.64
  See application file for complete search history.

(56) References Cited

U.S. PATENT DOCUMENTS

| | | | | |
|---|---|---|---|---|
| 3,229,353 | A * | 1/1966 | Morrison | F16C 33/64 |
| | | | | 72/368 |
| 4,825,524 | A * | 5/1989 | Buerger | B21D 53/32 |
| | | | | 228/140 |
| 4,913,979 | A * | 4/1990 | Buerger | B60B 7/01 |
| | | | | 428/577 |
| 5,191,683 | A * | 3/1993 | Ojima | F16L 33/025 |
| | | | | 24/20 R |
| 6,059,320 | A | 5/2000 | Lycan | |
| 9,593,731 | B2 * | 3/2017 | Takamura | C22C 38/00 |
| 10,759,001 | B2 * | 9/2020 | Miessmer | B23K 26/0604 |
| 11,149,793 | B2 * | 10/2021 | Friedrich | F16C 33/545 |
| 11,286,986 | B2 * | 3/2022 | Dimartino | F16C 17/04 |
| 2004/0239053 | A1 * | 12/2004 | Rowe | F16J 15/0887 |
| | | | | 277/654 |
| 2006/0202480 | A1 * | 9/2006 | Cassel | F16L 23/10 |
| | | | | 285/408 |
| 2010/0301567 | A1 * | 12/2010 | Schmitt | F16J 15/0887 |
| | | | | 219/148 |
| 2012/0061076 | A1 * | 3/2012 | McDaniel | E21B 19/12 |
| | | | | 166/241.6 |
| 2022/0003271 | A1 * | 1/2022 | Friedrich | F16C 33/64 |

FOREIGN PATENT DOCUMENTS

| | | | | |
|---|---|---|---|---|
| DE | 19930852 C1 * | 7/2000 | ............ | B23K 26/28 |
| EP | 2707174 A1 | 3/2014 | | |
| EP | 2889104 A1 * | 7/2015 | ......... | B23K 26/0869 |
| EP | 2889104 A1 | 7/2015 | | |
| JP | S6092076 A | 5/1985 | | |
| JP | S6221403 A | 1/1987 | | |
| JP | 2010184287 A | 8/2010 | | |
| WO | WO-2008145546 A1 * | 12/2008 | ............ | B23K 26/38 |
| WO | WO-2012152790 A1 * | 11/2012 | ............ | B23K 26/26 |
| WO | 2017148548 A1 | 9/2017 | | |

OTHER PUBLICATIONS

Machine English Translation of EP-2889104-A1 (Year: 2015).*
Machine English Translation of DE-19930852-C1 (Year: 2000).*
Machine English Translation of WO-2008145546-A1 (Year: 2008).*
Machine English Translation of WO-2012152790-A1 (Year: 2012).*
International Search Report corresponding to PCT/EP2017/055542, dated Dec. 8, 2017.

* cited by examiner

METHOD FOR PRODUCING A WELDED RING

CROSS REFERENCE AND PRIORITY CLAIM

This patent application is a U.S. National Phase of International Patent Application No. PCT/EP2017/055542, filed Mar. 9, 2017, the disclosures of which are incorporated herein by reference in their entireties.

BACKGROUND

Rings, so-called multi-crimp-rings, are produced in different ways. In one known method, an axially or helically welded tube is divided into rings of desired widths which are subsequently deburred. Disadvantages of this known method are high minimum production volumes required for reasons of cost, correspondingly low flexibility in case of different diameters, and high stock keeping cost for the tube blanks.

In an alternative production method, sections of a length corresponding to the ring circumference are cut from a deburred band cleaved along straight or inclined lines corresponding to the desired ring widths and their ends are welded together.

When welding the band ends, a weld that is flush with the edge of the ring can be obtained at the start of the welding process. At the weld exit on the other ring edge, however, a geometry results which is not flush with the edge.

In butt-welding a workpiece exposed to bending, it is known from EP 1 752 247 A1 to execute the weld in two partial welds which start at the outer ends and overlap one another in the central region to avoid notches at the outer rim of the workpiece.

SUMMARY

Disclosed embodiments are concerned with the general object of avoiding, at least in part, such drawbacks as occur with comparable methods of producing welded rings. A more specific object may be seen to reside in providing a method by which welded rings can be produced with an improved weld seam.

This object is successfully solved by providing at the band ends to be welded together an offset in the circumferential direction of the ring and performing the welding from both side edges of the ring from the outside inwards up to the offset. A flush weld is thereby made at both edges of the ring. As a result of the offset, the effect of the melt flowing away in the centre of the ring is reduced when the two weld seams overlap. Thereby, a higher welding quality in the overlapping area and a higher tensile strength are achieved.

BRIEF DESCRIPTION OF THE FIGURES

Embodiments will be described in more detail below with reference to the drawing. Therein shows.

DETAILED DESCRIPTION

Figure 1:
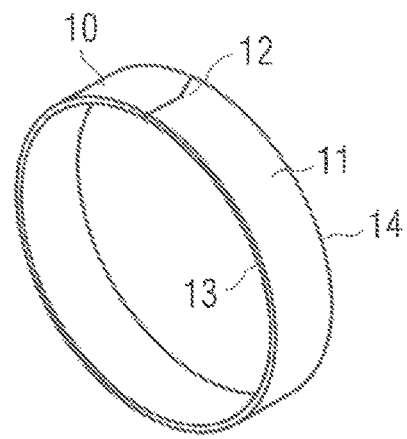
FIG. 1 a welded ring.
Figure 2:
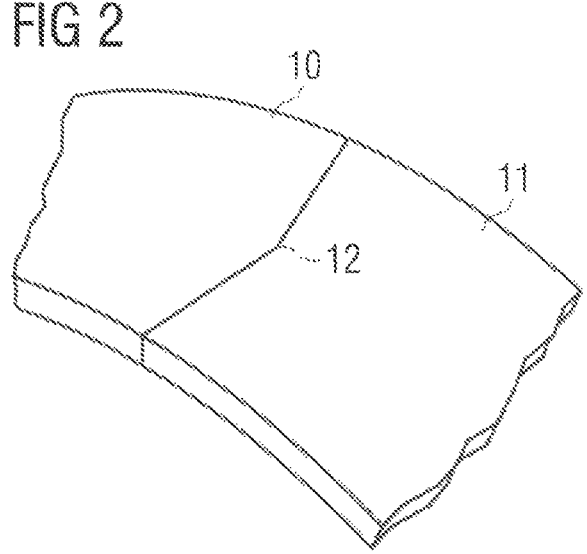
FIG. 2 an enlarged view of the butt of the ring before welding.
Figure 3:
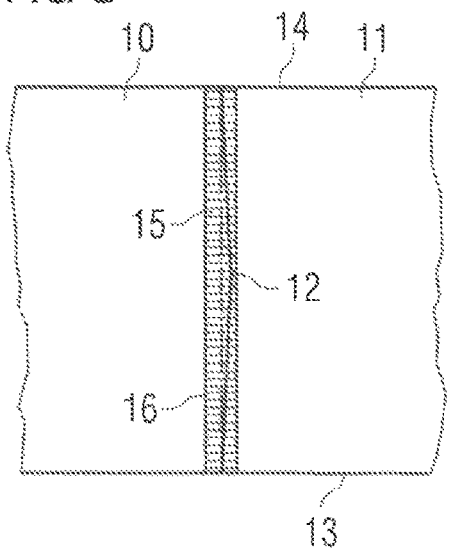
FIG. 3 an enlarged view of the butt of the ring after welding.

In FIGS. 1 to 3, the butt where both band ends 10, 11 are welded together is generally formed in a V-shape. The peak of the V-shape forms a discontinuity or an offset 12 in the butt and is formed midway between both band edges 13, 14.

In the (laser) welding process, welding is performed from both band edges 13, 14 up to the offset 12 (to the peak of the V-shape). Due to the offset, a higher welding quality is achieved in the area of overlap of both partial weld seams 15, 16 at the respective location. The offset 12 is only so big, i.e. the angle of the V-shape is only so small, that a controlled weld connection between both abutting band ends 10, 11 is formed also at this location.

As shown in FIG. 3, the laser in the welding process does not follow the V-shaped line of the abutting band ends. Instead, the welding process is performed such that it starts from each band edge 13, 14 in a straight line to the middle of the band such that the weld seam everywhere covers the V-shaped butt.

If there is no offset at the overlapping location of the two weld seams 15, 16, a weld puddle is formed twice at the abutting band ends. This leads to a reduced welding quality in the overlapping region. Due to the offset, the effects of the double weld puddle on the welding quality are reduced and more consistent.

Figure 4:
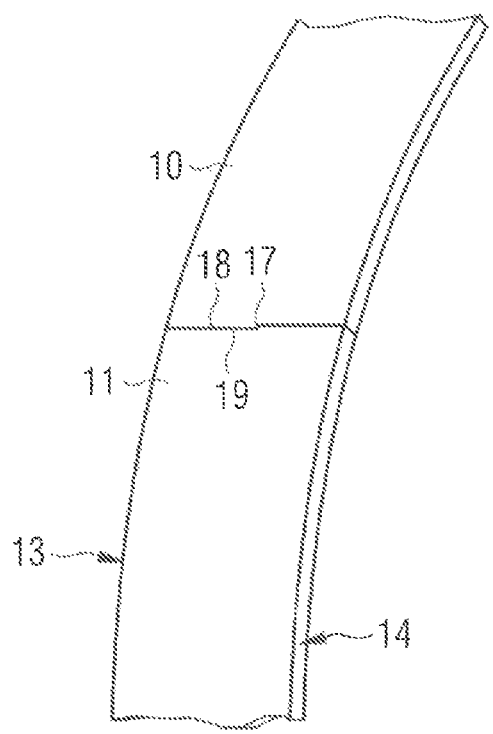
FIGS. 4 and 5 similar representations as FIGS. 2 and 3 with an alternative shape of the butt.
Figure 5:
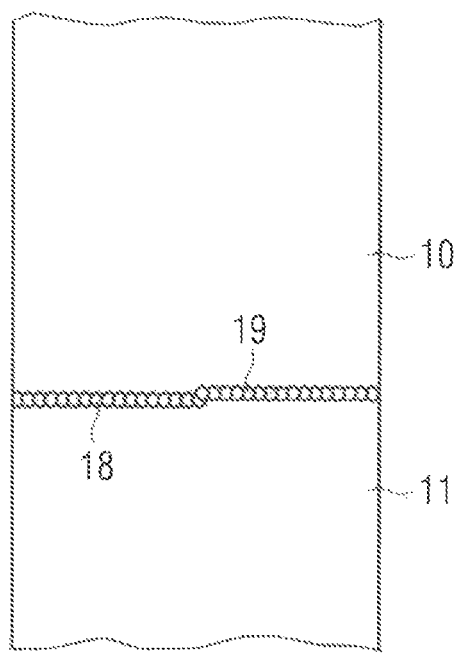

In the alternative embodiment of FIGS. 4 and 5, the butt where both band ends 10, 11 are welded together has a step 17 lying within the plane of the band, at which a projecting portion 18 of one band end 10 is opposite to a recessing portion 19 at the other band end 11. The step 17 is formed midway between both band edges 13, 14.

Figure 6:
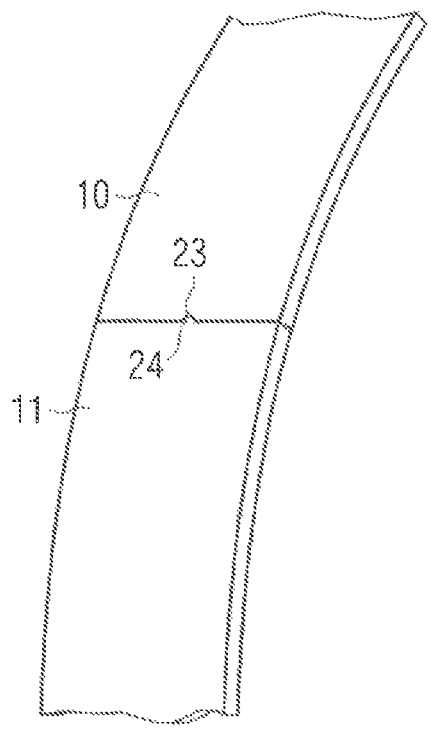
FIGS. 6 and 7 similar representations with a once more differently shaped butt.
Figure 7:
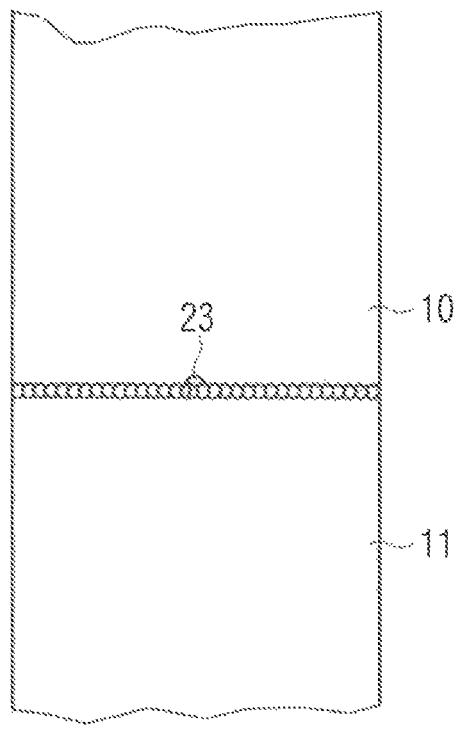

The embodiment of FIGS. 6 and 7 differs from that described above in that the offset is formed within the plane of the band and midway between the band edges 13, 14 as a recess 23 at the one band end 10, which is engaged by a complementary projection 24 at the other band end 11.

The invention claimed is:

1. A method of producing a welded multi-crimp ring, the method comprising:
    bending a band of a length corresponding to a circumference of the ring to form the multi-crimp ring, wherein a V-Shaped offset lies in a flat plane of the band prior to the bending, and the bending of the band changes the band to a cylindrical ring with a circumferential surface, wherein the flat plane of the band becomes a curved plane; and
    welding the curved plane of the band at its ends from both lateral edges of the multi-crimp ring from the outside inwards,
    wherein band ends to be welded together have a V-shaped offset in the circumferential direction of the welded multi-crimp ring,
    wherein the V-Shaped offset lies in the circumferential surface of the welded multi-crimp ring, and
    wherein the welding is performed in a continuous straight line such that a resulting weld seam fully covers the V-shaped offset.

2. The method of claim 1, wherein the welding is performed using a laser and the laser welding line fully covers the V-shaped offset.

* * * * *